No. 627,193. Patented June 20, 1899.
J. F. KELLY.
AMALGAM WASHING CHAMBER.
(Application filed Jan. 31, 1899.)
(No Model.)

WITNESSES:

INVENTOR:
JOHN F. KELLY.

BY

ATTORNEY.

UNITED STATES PATENT OFFICE.

JOHN F. KELLY, OF PITTSFIELD, MASSACHUSETTS.

AMALGAM-WASHING CHAMBER.

SPECIFICATION forming part of Letters Patent No. 627,193, dated June 20, 1899.

Application filed January 31, 1899. Serial No. 703,961. (No model.)

*To all whom it may concern:*

Be it known that I, JOHN F. KELLY, a citizen of the United States, residing at Pittsfield, county of Berkshire, State of Massachusetts, have invented certain new and useful Improvements in Amalgam-Washing Chambers, of which the following is a full, clear, and exact description.

My invention relates to washing-chambers used in connection with apparatus for electrolyzing salt for the production of caustic soda and its derivatives, and has for its object to provide a new and improved chamber producing advantageous results, as hereinafter described.

In the mercury-cathode process of electrolyzing salt for the production of caustic soda it has heretofore been customary to use either of two kinds of washing-chambers—one formed of some insulating material or one formed of some metal, generally iron. Both of these chambers have serious drawbacks. The insulating materials do not allow of as rapid an oxidation of the sodium as is desirable unless a great surface is employed, since oxidation is always more rapid in the presence of two connected heterogeneous conductors. In addition to this insulating-chambers are to some extent attacked by the soda, thus impairing the purity of the product. On the other hand, iron, while not directly attacked by caustic soda, oxidizes in the moist air or even in the liquid whenever free from soda. A very small amount of rust is sufficient to impair the appearance of a large quantity of soda, making the use of iron objectionable. I have found a simple and inexpensive way of overcoming both these difficulties, and the following is a description of my invention, reference being had to the accompanying drawings, in which—

Figure 1:
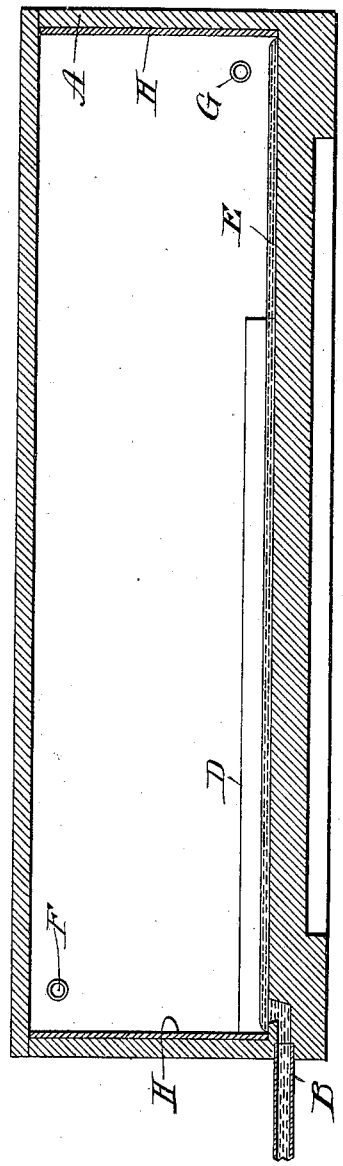
Figure 2:
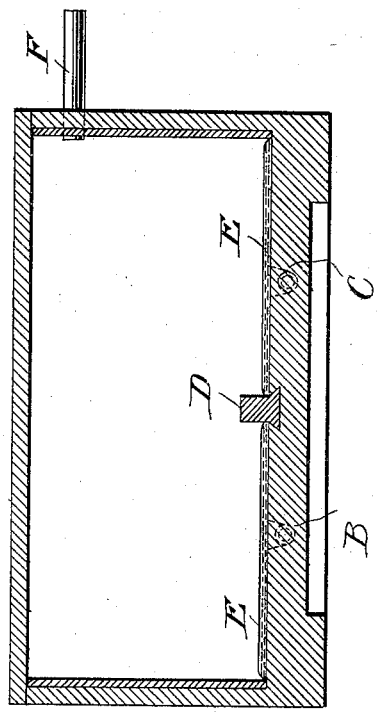

Figure 1 is a longitudinal section of my washing-chamber, Fig. 2 being a cross-section of the same.

Referring to the drawings, A represents a vessel which for the purpose of strength is generally made of cast-iron. This vessel is provided with an inlet F for fresh water and an outlet G for the caustic soda. It also has a ridge D, extending part way of its length, formed of some material which is not attacked by caustic soda. It is furthermore provided with an inlet B and an outlet C for the amalgam of mercury and sodium E, the same being compelled by the ridge D to circulate throughout the whole of the chamber. In order that the caustic soda should not come in contact with the iron or be liable to be discolored by iron rust, I completely line the sides of the tank with carbon H, which may be in plate form or any other form which can be conveniently used. These carbon plates extend to the bottom of the tank and come in electrical contact with the amalgam, from which it results that the solution is entirely protected from contamination by oxid of iron, and at the same time the necessity for a great extent of surface of mercury, such as is necessary when insulating-walls are used, is avoided. The ridge D, being exposed to the caustic soda, may be made of any material which is not attacked by caustic soda or may be made of carbon, if desired.

What I claim is—

1. A washing-tank for an alkaline-metal amalgam having carbon sides in a position to be in electrical communication with said amalgam, substantially as described.

2. A washing-tank for sodium-mercury amalgam having the portions exposed to the washing solution composed of carbon in a position to be in electrical communication with said amalgam, substantially as described.

Signed at Pittsfield, Massachusetts, this 28th day of January, 1899.

JOHN F. KELLY.

Witnesses:
C. C. CHESNEY,
M. L. NICHOLS.